Oct. 11, 1966   J. G. DORAN   3,277,779
INFORMATION SELECTOR DEVICE AND PROJECTION SYSTEM
Filed May 11, 1964   4 Sheets-Sheet 1
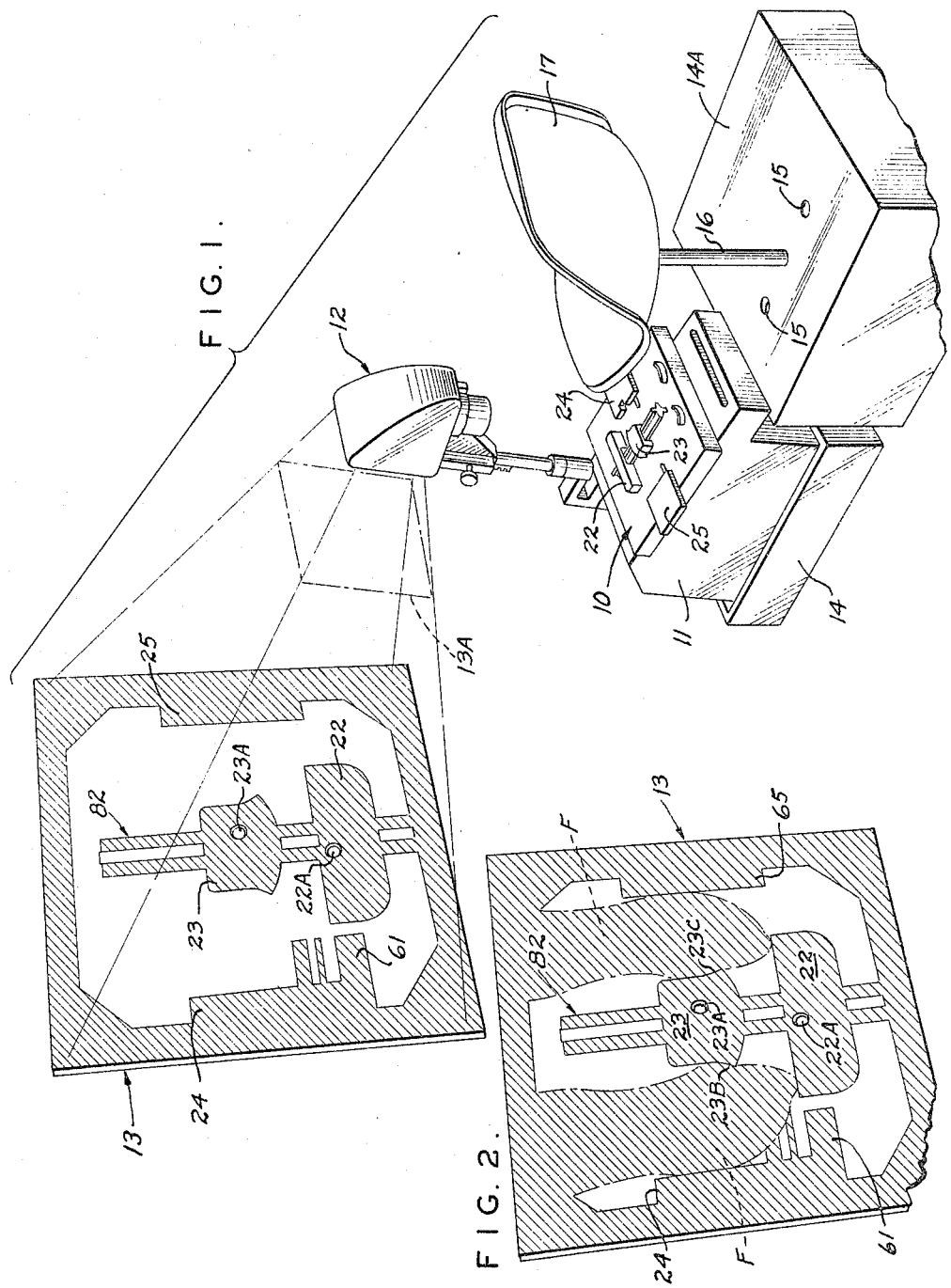
INVENTOR.
JOHN G. DORAN
BY
Gravely, Lieder & Woodruff
ATTORNEYS

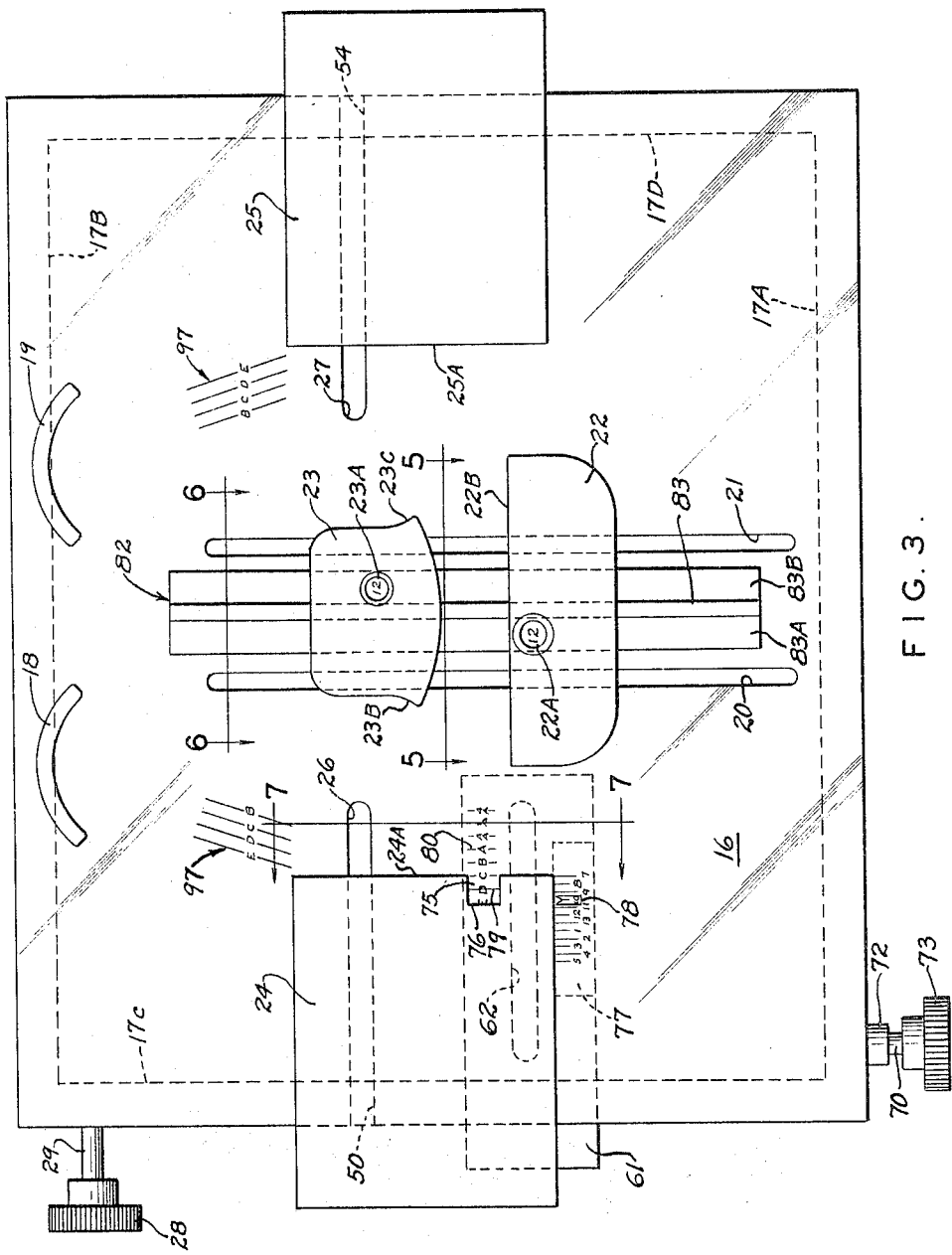

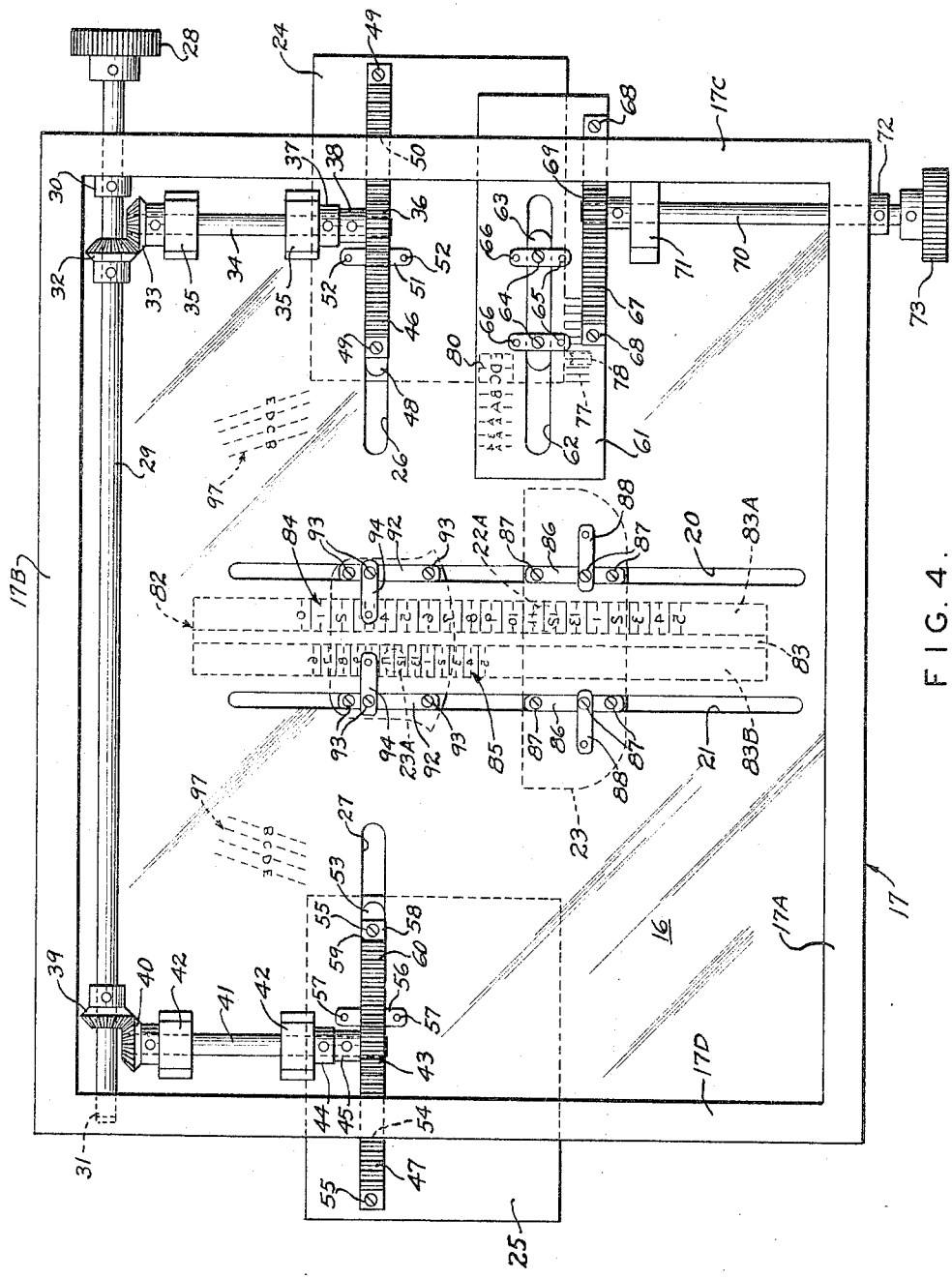

Oct. 11, 1966 J. G. DORAN 3,277,779
INFORMATION SELECTOR DEVICE AND PROJECTION SYSTEM
Filed May 11, 1964 4 Sheets-Sheet 4

INVENTOR.
JOHN G. DORAN
BY
Gravely, Lieder & Woodruff
ATTORNEYS

United States Patent Office 3,277,779
Patented Oct. 11, 1966

3,277,779
INFORMATION SELECTOR DEVICE AND
PROJECTION SYSTEM
John G. Doran, 2006 St. Clair, Brentwood, Mo.
Filed May 11, 1964, Ser. No. 366,409
12 Claims. (Cl. 88—24)

This invention relates to improved means to select desired information from an object or source of information and to a system for projecting the information to where it may be seen for analysis or other use. The invention also relates to the improved application of selector means in a projection system so that only desired information is made visible.

The present invention has a number of useful applications in information selection operations, navigation situations, retailing operations, and allied activities. While the scope of the invention may be quite broad and varied, it is believed that the principles hereof may be set forth conveniently in connection with shoe size and fitting operations so that selective foot size information may be obtained and displayed for the better satisfaction of customers and accuracy of shoe fit.

An important object of the invention is to provide an information selector device and projection system which will correlate desired information and make it readily visible while obscuring unwanted information.

It is an object of the invention to visually provide discrete data from an information source for rapid use or evaluation by the operator.

Another object of the invention is to provide selector means for rapidly inspecting a source of information for a visual projection system and for obscuring unwanted information while enlarging desired information.

Yet another object of the invention is to provide a novel selector device for shoe fitting in which both feet are inspected and compared at the same time for dimensional information leading to selection of proper shoe size.

Still another object of the invention is to provide a projector system embodying a device for determining foot dimensions and comparing such dimensions for both feet in silhouette.

A further object of the invention is to provide apparatus which will illuminate an informational source for accurate selection of desired information and for projecting the selected information upon a viewing surface where the same can be observed easily.

Other objects and advantages will become more fully apparent from the disclosure of a presently preferred embodiment of the invention which is illustrated in the accompanying drawings, wherein:

FIG. 1 is a perspective view of the system of this invention showing the information source and projection means therefor;

FIG. 2 is a fragmentary view of a projection screen used for comparing feet for purposes of shoe selection;

FIG. 3 is a top plan view of the information selector device shown generally in FIG. 1;

FIG. 4 is a view taken from the under side of the selector device shown in FIG. 3;

Figure 5:
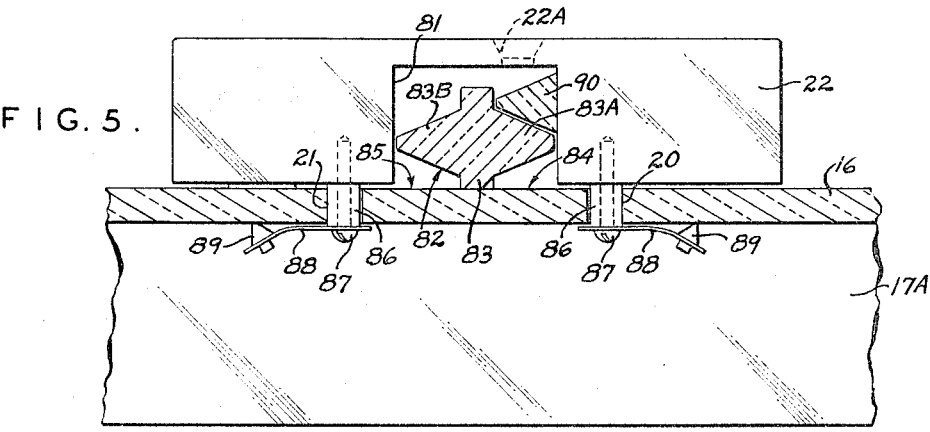
FIG. 5 is an enlarged fragmentary sectional elevational view taken at line 5—5 in FIG. 3.

Referring to FIG. 1 the system shown is set up for the selection of shoes to determine visually the size that is most suitable. The system includes, but without limitation, a foot size selector device 10 supported on a base 11 which is a housing containing the source of illumination, a focusing type projector device 12 of known character, and a screen 13. The device 10 and base light source 11 may be supported on a stand 14 which includes a raised portion 14A having a plurality of holes 15 to receive the center post 16 of a seat 17. The customer to be fitted with shoes sits in the seat 17 and places both feet on the device 10. The feet being opaque, the silhouette thereof is cast upon the screen 13 along with the image of the opaque portions of device 10. The result is shown in FIG. 2 where the feet F are depicted on screen 13 as opaque or dark areas, as are the opaque portions of device 10.

It is, of course, recognized that the screen 13 is set so that the customer and the sales person both may see the measurement of the feet. In an alternate arrangement the screen 13 may be placed closer to the projector device 12, as at 13A, in which case the sales person alone can see the measurement of the feet, and in this case the screen 13A is made transparent.

The device 10 is seen in greater detail in FIGS. 3 and 4, FIG. 4 being the under side view of FIG. 3. In these views, the presently preferred device includes a platform 16 of light transparent material having a frame 17 supporting the margins thereof. The frame is composed of pieces 17A and 17B at the longer sides and pieces 17C and 17D at the shorter sides. The platform is provided with heel stops 18 and 19 adjacent the frame piece 17B, but on the top surface, so that the feet may be located adjacent elongated slots 20 and 21, respectively, which open through the platform and act as directional guides for a toe abutment slide 22, and a ball slide 23. The slides 22 and 23 are opaque so that each casts a shadow on screen 13. The slots 20 and 21 are parallel and keep the slides 22 and 23 from canting or binding during movement toward or away from the heel stops 18 and 19. As shown, the opaque slide 22 has an aperture 22A opening through it, and a similar aperture 23A is provided in slide 23. These apertures 22A and 23A are offset as each cooperates with a separate scale which will be described presently.

The platform 16 also supports a pair of opaque foot width slides 24 and 25 which move in the direction determined by slots 26 and 27, respectively, formed in the platform 16. The slots 26 and 27 are perpendicular to slots 20 and 21 so that slides 24 and 25 move toward or away from the slide 23. Slides 22 and 23 are manually movable, slide 22 being formed with a surface 22B to touch the toes of the feet being measured for foot length from heel to toes, and slide 23 being formed with curved elements 23B and 23C which cooperate with the inside margins of the feet for measuring the length of the feet from the heels to the ball of the feet as this is an important measurement characteristic. Slides 24 and 25 have inside edges 24A and 25A, respectively, for abutment with the outside margins of the feet. The cooperation of opaque slides 22, 23, 24 and 25 with feet F are shown in FIG. 2.

In FIG. 4, which is the under side of the device 10, a drive mechanism for simultaneously displacing slides 24 and 25 is seen to include a control knob 28 on an elongated shaft 29. The shaft 29 extends through frame piece 17C and a bearing block 30 and spans the frame so that its opposite end 31 is supported in the frame piece 17D. The shaft operates a first bevel gear 32 which drives bevel gear 33 on shaft 34. Shaft 34 is mounted in bearing blocks 35 carried by the platform 16 and carries a spur gear 36 on its outer end. The shaft 34 is fixed against longitudinal displacement by the hub of bevel gear 33 and by a spacer ring 37 and hub 38 of gear 36, ring 37 being an abutment for the spur gear hub 38

Figure 7:
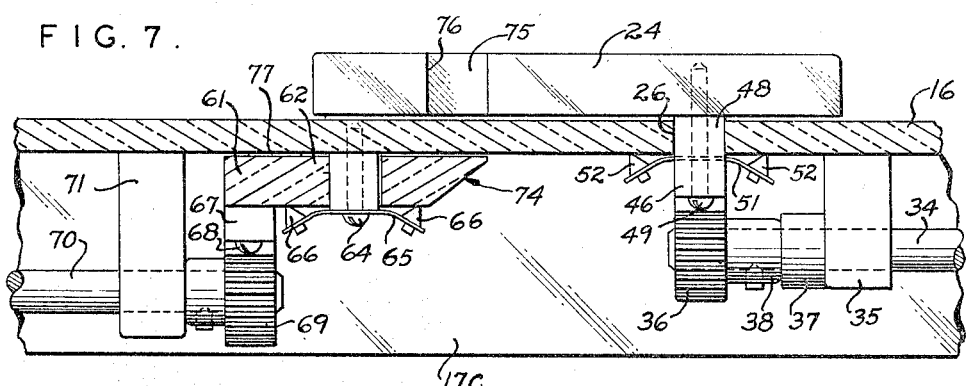
FIG. 7 is an enlarged fragmentary sectional elevational view taken at line 7—7 in FIG. 3.

(FIG. 7). In similar manner, the shaft 29 carries a second bevel gear 39 near end 31 to drive a bevel gear 40 on short shaft 41 carried in bearing blocks 42 supported from the platform 16. A spur gear 43 and a spacer ring 44 and hub 45 of gear 43 are utilized to locate the shaft 41 and gear 43. Rotation of control knob 28 serves to drive the foregoing shaft and gear trains for simultaneous movement of slides 24 and 25. The drive connection with the slides is through a rack 46 on slide 24 and rack 47 on slide 25. The rack 46 is secured to a guide block 48 movable in slot 26, and the rack 46 and guide block 48 are secured in position and attached to the slide 24 by screws 49. Assembly of the block 48 and rack 46 on slide 24 is effected through the outer end of slot 26 which opens at 50 through the margin of the platform 16 over frame piece 17C. A friction brake is used to prevent looseness in the action of slide 24, said brake including a resilient leaf 51 clamped under the rack 46 so that its opposite ends are free to carry brake shoes 52 pressed upwardly (FIG. 7) against the under side of platform 16.

The opposite slide 25 is provided with a guide block 53 movable in slot 27 through its open outer end 54, and the rack 47 and block 53 are secured to the slide 25 by screws 55. A friction brake is provided in the form of a resilient leaf 56 clamped between the rack 47 and block 53, with brake shoes 57 carried at its outer ends in like manner to that shown in FIG. 7 for shoes 52. Since the slots 26 and 27 have outer open ends 50 and 54 as seen in FIGS. 3 and 4, a stop element attached to rack 47 by screw 55 is provided. The stop element is formed with a base 58 for the attaching screw 55, a vertical leg 59 of sufficient length to position the horizontal leg 60 to pass over the spur gear 43, thereby causing the leg 59 on outward movement of the slide 25 to abut gear 43. As the gears 36 and 43, as well as the drive gears on shafts 29, 34 and 41, have suitable set screws it is understood that the above described mechanism may be easily assembled and adjusted before the set screws are tightened.

Foot width measuring slide 24 is provided with an auxiliary slide 61 movable adjacent the under surface of platform 16 as may be seen in FIGS. 3, 4 and 7. The slide 61 is formed with a closed ended slot 62 adapted to fit over a fixed guide block 63 attached by screws 64 to the platform 16. The slide 61 is provided with brake means in the form of a pair of resilient leaf elements 65 secured by the screws 64 at the mid-position so that brake shoes 66 are pressed into contact with the slide (see FIGS. 4 and 7). Slide 61 carries a rack bar 67 secured by screws 68, and the rack bar 67 engages a spur gear 69 on the inner end of a shaft 70 supported by a bearing block 71. The outer end of shaft 70 extends through frame piece 17A and locating ring 72 for reception of a control knob 73. The slide 61 is light transparent and is formed with a prism form of bevelled margin 74 (FIG. 7) which extends over the under side of the transparent platform 16 so as to underlie the location of a corrective prism 75 carried in a notched recess 76 formed in a portion of margin 24A of slide 24. The bevelled margin 74 is on one side of the fixed guide block 63, and the portion of the slide 61 on the opposite side of the block 62 carries an opaque strip 77 on its top surface which is adjacent the under side of platform 16 and is visible from the top side, as seen in FIG. 3. The strip 77 carries a foot length scale which cooperates with a fixed index mark 78 scribed in the platform 16 so that the slide 61 may be movably adjusted through knob 73, independently of slide 24, to position the foot length scale on strip 77 relative to the index 78.

Slide 24 carries the prism 75 as indicated, and the prism 75 is provided with a hair line mark 79 (FIG. 3). The prism 75 is a light transmission correcting element which cooperates with the prism bevelled margin 74 of slide 61 to allow light to be transmitted from the margin 74 only in the area corrected by prism 75. Margin 74 carries foot width indicia 80 (FIG. 3) which is not illuminated through the platform 16, but is visible when the light source is turned off. With the light turned on, the indicia 80 directly under the prism 75 is made visible and the particular value of indicia 80 at the prism 75 may be projected by the means 12, other portions of the indicia on the prism margin 74 being obscured by the refracting nature of the margin. Thus, slide 24 is positioned with its edge 24A touching the side of the adjacent foot (the right foot in FIG. 3) and the prism 75 is set in its intended position. Auxiliary slide 61 is then moved by knob 73 to relate the scale indicia 77 relative to the index 78, and in so doing the indicia 80 is moved to bring a foot width size indicia (one of the lettered or fraction marks) to position under prism 75 so that the hair line 79 is effective to indicate the foot width or fraction thereof. The purpose for the auxiliary slide 61 will be explained presently. It will be remembered that adjustment of slide 24 by knob 28 also adjusts the left foot slide 25, so that either slide 24 or 25 may be used to determine the foot width for shoe selection to match.

It has been pointed out that slide 22 is manually movable along slots 20 and 21. Now looking at FIGS. 4 and 5, it can be seen that the slide 22 is formed with a notch 81 in its under side to receive a double refraction prism member 82 which is fixed on the top face of platform 16 between slots 20 and 21. The member 82 may be formed as one piece in which there is a central rib 83 for its mounting and laterally projecting prism elements 83A and 83B which are so formed that light passing up through the platform 16 is refracted to an angular direction that will not permit scalar indicia 84 or 85 scribed or formed in or upon the surfaces of the platform directly below to become visible when viewed from directly above the member 82, as in the view of FIG. 3. This explains why FIG. 3 does not show the indicia 84 and 85, except at apertures 22A and 23A respectively.

In FIGS. 4 and 5, the slide 22 is slidably mounted on the platform 16 by a pair of guide blocks 86 movable in the closed end slots 20 and 21. The blocks are attached by screws 87, and the slide 22 and blocks 86 are retained by brake leaves 88 of resilient material, each leaf supporting a brake shoe 89 to prevent loose operation of slide 22 and to retain said slide in its moved setting. Thus, slide 22 may be moved along slots 20 and 21 so that the aperture is aligned with the indicia 84. Since the prism element 83A on member 82 obscures the light passage directly or vertically upwardly, it is necessary to provide a correcting prism 90 in the notch 81 over prism element 83A to redirect the light through aperture 22A. The aperture 22A confines the view of indicia 83A to the limited area therebelow, all other portions being rendered invisible by the opaque body of the slide and by other portions of the prism element 83A. The indicia 84 on the surface of platform 16 runs lengthwise under the prism 83A and is made to conform to foot length scale for determining heel to toe length from the heel stop 18 or 19.

Figure 6:
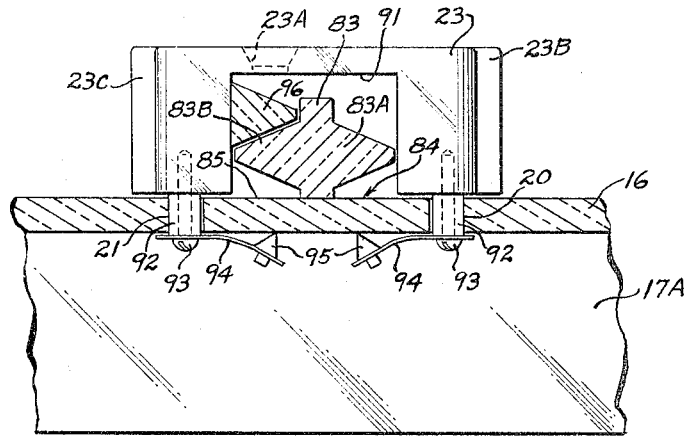
FIG. 6 is an enlarged fragmentary sectional elevational view taken at line 6—6 in FIG. 3.

The slide 23 in FIGS. 4 and 6 is also formed with a notch 91 on its under side to receive the lens member 82. Slide 23 is provided with a pair of guide blocks 92 movable in slots 20 and 21, the blocks and slide being retained by screws 93 and by resilient brake leaves 94. The leaves carry brake shoes 95 to hold the slide 23 in moved position. Slide 23 has a correcting prism 96 in notch 91 just under aperture 23A so that the light transmission to illuminate scale 85 can be made effective to the portion of such scale directly below aperture 23A. The remainder of scale 85 being obscured to view from above by the opaque body of slide 23 and the refracting nature of prism element 83B.

One example of operation of device 10 will serve to make clear the operation of the present system and the apparatus of which it is composed. First, in FIG. 3 it is noted that the slide 23 has been adjusted or slidably positioned relative to its distance from heel stops 18 and 19 so that the numeral 12 of scale 85 is visible in aperture 23A. This means that the foot length from heel to ball of either foot, or the average reading, is 12 on such scale. Slide 22 has also been adjusted or slidably positioned relative to the heel stops 18 and 19 so that the heel to toe length, or the average toe reading, can be selected from scale 84. If the feet are normal, the heel-toe scale reading should be the same as or very close to the heel-ball scale reading. Thus, the scale number 12 has been made visible in aperture 22A. In many cases the scale reading in apertures 22A and 23A will be different due to the variations in foot structure. When this difference occurs, the larger scale number visible at either slide 22 or 23 is selected.

Next, the knob 28 is turned in the required direction to bring slides 24 and 25 up to the side of the feet. It is expected that the slide margins 24A and 25A will both be able to touch the side of the feet at the same time. This adjustment sets the prism 75 in slide 24, but if one foot is slightly wider, the slides 24 and 25 will be adjusted so that the wider foot is used to select the position for prism 75.

The foregoing two operations are performed while both feet are placed on platform 16 without any body weight thereon. The scales 84 and 85 are selected to take into account the increase in foot size or dimensions when supporting the body. Having carried out the adjustments above described, the operator next adjusts knob 73 to move auxiliary slide 61 until the scale 77 is brought to the position where the indicia 12 is aligned with the index 78. Number 12 is obtained by taking the larger of the scale numbers visible in slide apertures 22A and 23A. The movement of slide 61 also moves scale 80 so that the width indicia is aligned relative to hair line 79, thus giving the foot width reading. In the example of FIG. 3, the feet being measured should take a shoe size 12D.

It should be noted that the scales used are suitable for children's feet, but other suitable scales may be applied to the device for adult shoe fitting purposes. When small children are to be fitted and the feet do not reach out from heel stops 18 and 19 to make slides 24 and 25 useful, the platform 16 is provided with scales 97 (FIGS. 3 and 4) for width determination, and slides 22 and 23 will be used as above described. It is to be noted also that the slide 23 is moved to the position where the curved element 23B or 23C fits snugly on the ball of the right or left foot, as the case may be.

The device 10 is conveniently employed in the system shown in FIGS. 1 and 2 by placing it over the light source box 11 so that all light transparent portions are illuminated. The projector device 12 will then pick up the image of the light and dark or opaque areas and cast the enlarged image on screen 13 for the customer to see. The prism means used in device 10 will therefore act to obscure all portions of the scales except those intended to be seen at apertures 22A and 23A, and at prism 75. All scale portions not corrected by prisms 75, 83A and 83B will not become visible, and no confusion can be caused. Also the movement of opaque slides 22, 23, 24 and 25 can be easily watched to see that the adjustments are made correctly so as to press against the feet or leave a space because they are not moved up to just touch the feet. This is very important when measuring children's feet as the feet may be in a growth condition where one foot is larger. Thus the fitting can be made to the larger foot so that no crowding danger is caused. Also, children are difficult to fit by just feel of the shoe on the foot, whereas adults by experience are better able to judge shoe fit in this manner. The device 10 and the system in which it is used will have the effect of causing children to be attentive to the fitting procedure, thereby making it easier to obtain shoe selection of the proper size.

What is claimed is:

1. A system for sizing both feet of a customer at one time and developing an image thereof for viewing, said system including a transparent platform for supporting both feet, feet sizing scales carried by said platform, opaque movable slide means on said platform cooperable with said sizing scales and engageable with the feet, a source of illumination under said platform to silhouette said slide means and feet, means on said slide means to silhouette only indicia on said scales corresponding to the feet on said platform, and means to show the image of the feet and slide means together with the silhouetted indicia for simultaneous viewing.

2. An information viewing and selector device including a platform, information indicia carried by said platform, slide means movably mounted on said platform adjacent said information indicia, a source of illumination to illuminate said information indicia for viewing, obscuring prism means on said platform adjacent said information indicia to obscure the information indicia from view, and corrective prism means on said slide means to render visible the obscured information indicia at a position where said corrective prism means is located by movement of said slide means.

3. The viewing and selector device set forth in claim 2, wherein said platform is transparent and said slide means are opaque, and said source of illumination is on the side of said platform opposite from the viewing position.

4. The viewing and selector device set forth in claim 2, wherein brake means is connected to said slide means to retain the slide means in moved position.

5. In a foot size indicating device, a platform on which both feet are placed to be sized for shoes, heel stops on said platform for the feet, a first slide on said platform movable relative to said heel stops to determine foot length from heel to ball, a second slide on said platform movable to determine foot length from heel to toes, a pair of slides on said platform movable toward and away from the path of movement of said first and second slides to engage and determine the width of the feet, and an auxiliary slide on said platform movable relative to at least one of said pair of slides to coordinate the determination of said first and second slides with said pair of slides in the sizing of feet for shoe fit.

6. A foot size indicating device as set forth in claim 5, wherein said first and second slides are manually movable independently of each other, and said pair of slides are movable conjointly.

7. A foot size indicating device as set forth in claim 5, wherein means is provided to connect said pair of slides together for simultaneous movement, and other means is provided to move said auxiliary slide.

8. A foot size indicating device as set forth in claim 5, where brake means is mounted between said slides and platform, said brake means having friction elements serving to retain said slides in moved position.

9. A foot size indicating device as set forth in claim 5, wherein said platform is light transparent, said slides are opaque, a source of illumination is placed adjacent said platform to silhouette said slides, and foot size indicia is disposed adjacent said slides.

10. A scale indicia viewing assembly including, a scale having individual indicia for viewing, scale indicia selecting means movable relative to said scale, the scale indicia selecting means being provided with a scale viewing opening, a prism member adjacent said scale and said movable scale indicia selecting means, said prism member obscuring said scale indicia from view therethrough, and an element mounted on the scale indicia selecting means and positioned adjacent said opening to correct the scale indicia obscuring action of said prism member for a portion of said scale selected by said scale indicia selecting means.

11. A scale indicia viewing assembly including, a scale having individual indicia for viewing, scale indica selecting means movable relative to said scale, a source of illumination for said scale on the side opposite the position of viewing, said illumination silhouetting said indicia, a prism member adjacent said scale and said movable scale indicia selecting means, said prism member obscuring said scale indicia from view therethrough, and an element mounted on the scale indicia selecting means to correct the scale indicia obscuring action of said prism member for a portion of said scale selected by said scale indicia selecting means.

12. A scale indicia viewing assembly including, at least two scales having indicia for viewing, said scales being linear and in adjacent rows, at least two scale indicia selecting means movable relative to said scales, a prism adjacent each of said scales to obscure the direct viewing of the indicia thereon, said prism adjacent each scale being linear and being between said scale and the viewing position, each of said scale indicia selecting means being independently movable along said prisms, and view correction means mounted on each scale indicia selecting means and adjacent one of said prisms to correct the scale indicia obscuring action of the prisms for a portion of the scale selected by said scale indicia selecting means, each view correction means being similar to the prism it corrects but being optically reversed in position.

References Cited by the Examiner
UNITED STATES PATENTS

| | | | |
|---|---|---|---|
| 2,078,368 | 4/1937 | Brannock | 33—3 |
| 2,175,116 | 10/1939 | Hack et al. | 33—3 |
| 2,650,518 | 9/1953 | Zaroff et al. | 33—3 X |
| 2,676,515 | 4/1954 | Diel | 88—24 |
| 2,942,344 | 6/1960 | Brannock | 33—3 |
| 3,173,746 | 3/1965 | Rockmore | 33—3 |
| 3,192,627 | 7/1965 | Levitt et al. | 33—3 |

NORTON ANSHER, *Primary Examiner.*

V. A. SMITH, *Assistant Examiner.*